(12) United States Patent
Colosimo

(10) Patent No.: US 9,220,293 B2
(45) Date of Patent: Dec. 29, 2015

(54) APPARATUS FOR FORMING A FOOD PRODUCT

(71) Applicant: Paul Colosimo, Salt Lake City, UT (US)

(72) Inventor: Paul Colosimo, Salt Lake City, UT (US)

(*) Notice: Subject to any disclaimer, the term of this patent is extended or adjusted under 35 U.S.C. 154(b) by 3 days.

(21) Appl. No.: 13/935,128

(22) Filed: Jul. 3, 2013

(65) Prior Publication Data
US 2014/0037811 A1 Feb. 6, 2014

Related U.S. Application Data

(60) Provisional application No. 61/667,858, filed on Jul. 3, 2012.

(51) Int. Cl.
| | |
|---|---|
| *A23P 1/12* | (2006.01) |
| *B29C 47/08* | (2006.01) |
| *A22C 7/00* | (2006.01) |
| *B29C 47/12* | (2006.01) |
| *B29C 47/30* | (2006.01) |
| *B29C 47/70* | (2006.01) |

(52) U.S. Cl.
CPC ... *A23P 1/12* (2013.01); *A22C 7/00* (2013.01); *B29C 47/0822* (2013.01); *B29C 47/12* (2013.01); *B29C 47/30* (2013.01); *B29C 47/702* (2013.01)

(58) Field of Classification Search
CPC ........ A22C 7/00; A23P 1/12; B29C 47/0822; B29C 47/12; B29C 47/30; B29C 47/702
USPC ........... 425/192 R, 308, 377, 382 R, 461, 464
See application file for complete search history.

(56) References Cited

U.S. PATENT DOCUMENTS

| | | | |
|---|---|---|---|
| 109,034 A * | 11/1870 | Menham et al. | ........... 425/192 R |
| 4,148,598 A | 4/1979 | Colosimo et al. | |
| 4,283,812 A | 8/1981 | Corominas | |
| 4,293,979 A | 10/1981 | Colosimo et al. | |
| 4,391,575 A * | 7/1983 | Osrow | ........... 425/190 |
| 4,530,132 A | 7/1985 | Wagner | |
| 5,037,350 A | 8/1991 | Richardson et al. | |
| 5,051,088 A * | 9/1991 | Frank | ........... 425/72.2 |
| 5,198,237 A | 3/1993 | Colosimo et al. | |
| 6,572,360 B1 | 6/2003 | Buhlke et al. | |
| 2005/0048180 A1 | 3/2005 | Moore et al. | |
| 2008/0241327 A1* | 10/2008 | Hunter | ........... 426/516 |

FOREIGN PATENT DOCUMENTS

| | | |
|---|---|---|
| EP | 0074203 A2 | 3/1983 |
| WO | 9414324 A1 | 7/1994 |

* cited by examiner

*Primary Examiner* — Yogendra Gupta
*Assistant Examiner* — Joseph Leyson
(74) *Attorney, Agent, or Firm* — Morriss O'Bryant Compagni, PC

(57) ABSTRACT

An apparatus for extruding foodstuffs is comprised of a one-piece housing having an inlet configured to be attached to a food processing machine, a distributor portion integrally formed with the inlet, the distributor portion having at least two side walls outwardly angled from the inlet, a die retaining portion configured for housing a die therein and integrally formed with the side walls, and an outlet through which an extruded food product can exit. A die defining at least one passage for forming a food product having a shape defined by the passage is inserted into the housing. A pair of removable retaining members extends through the housing and abuts against the die to retain the die within the housing.

12 Claims, 12 Drawing Sheets

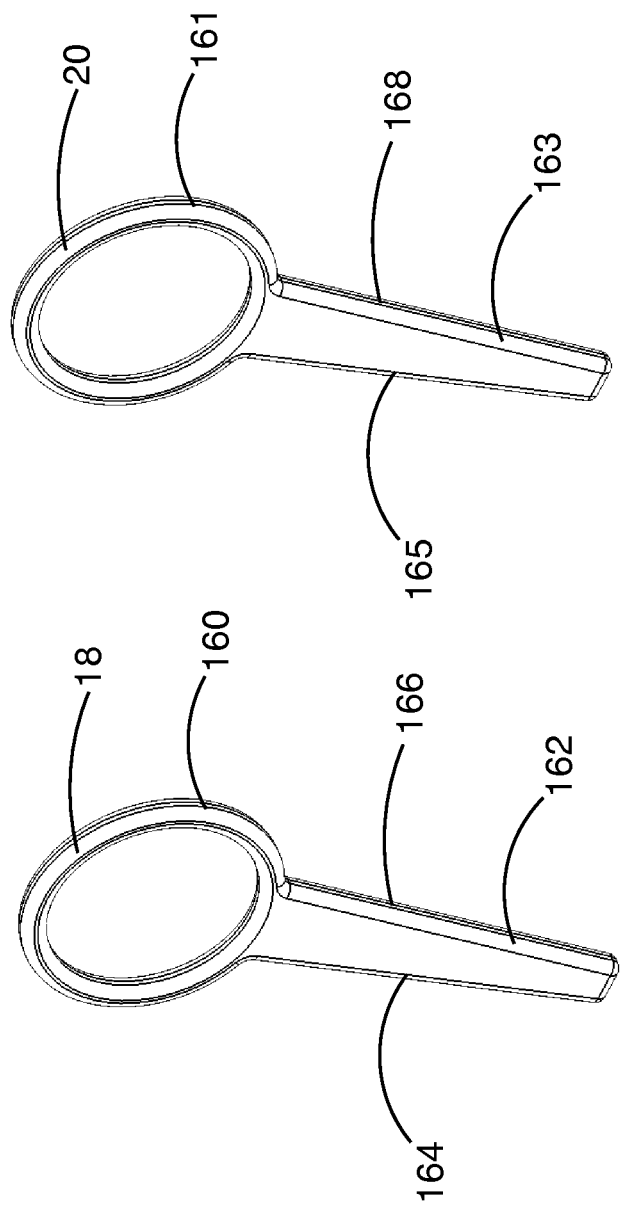

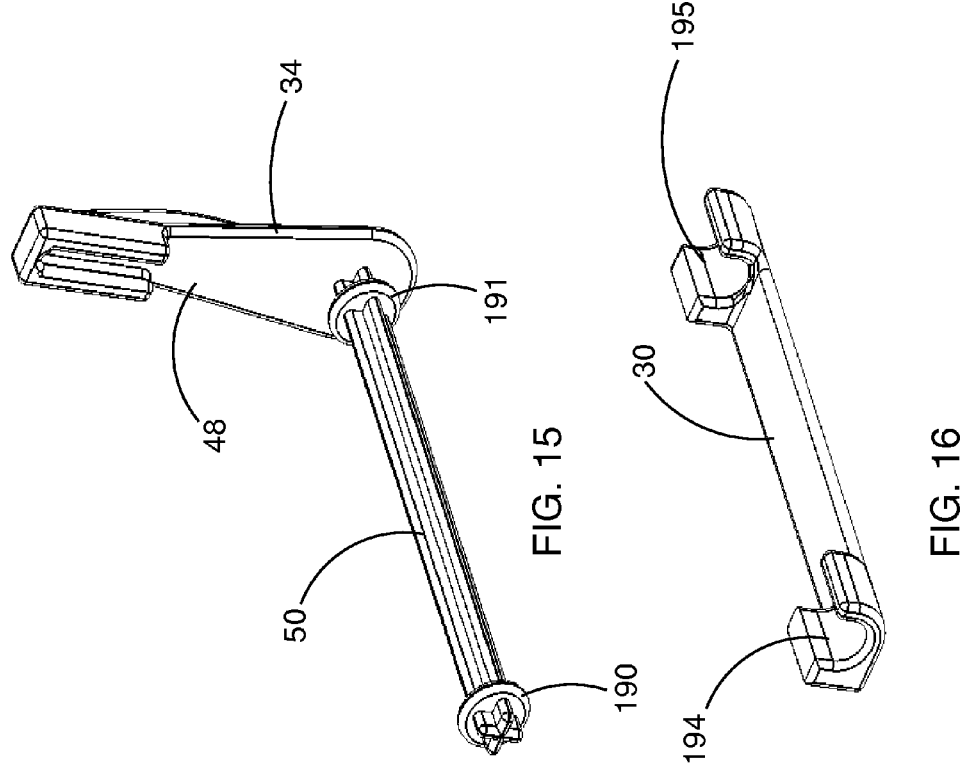

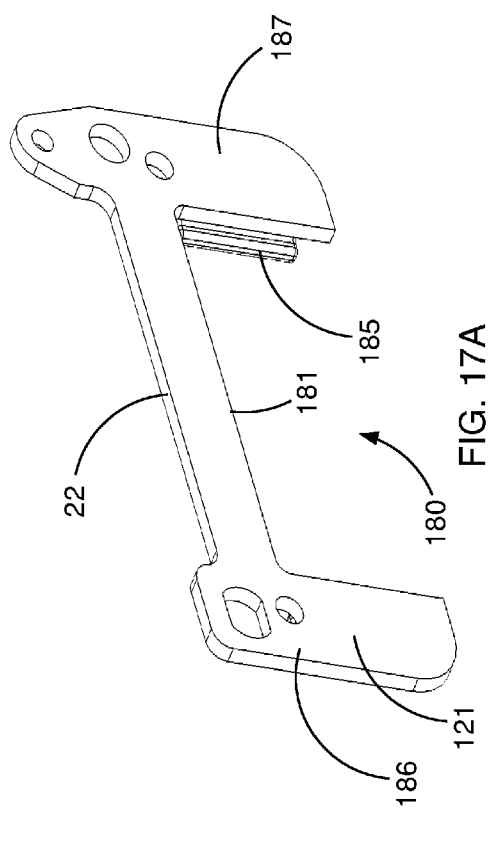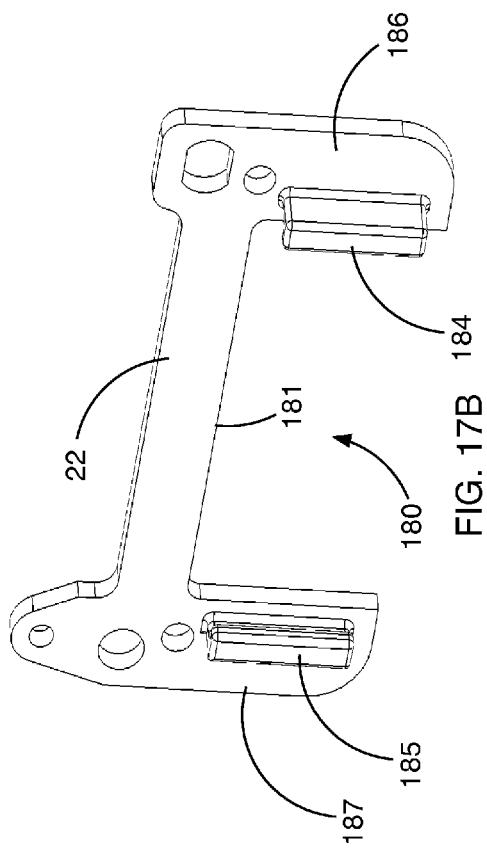

APPARATUS FOR FORMING A FOOD PRODUCT

CROSS-REFERENCE TO RELATED APPLICATION

The present invention claims priority to U.S. Provisional Patent Application Ser. No. 61/667,858 filed on Jul. 3, 2012, the entirety of which is incorporated by this reference.

BACKGROUND

1. Field of the Invention

The present invention relates generally to forming presses by which foodstuffs are shaped and formed and more specifically to extrusion-type devices for shaping and forming foodstuffs into a desired shape by an extrusion process.

2. State of the Related Art

Various machines have been developed over the years for forming foodstuffs and particularly ground meats in order to provide pre-shaped products for human consumption. Commercial extruding machines can range from large machines capable of producing hundreds of pounds of extruded food product per hour, such as Reiser's VEMAG extruders, to smaller extrusion machines that are particularly suitable for smaller operations, such as within the meat department of a grocery store. While larger commercial extrusion machines are typically used in large commercial operations, there is a need in the industry for smaller extrusion machines that can be used with existing equipment.

For example U.S. Pat. Nos. 4,148,598, 4,293,979 and 5,198,237, the entirety of each of which is incorporated by this reference, disclose foodstuff extruding machines with particular applicability to ground meat products. These devices were configured for use with existing grinding machines that grind foodstuffs, such as meat, and force the ground product through a die. The die has one or more particularly shaped passages through which the ground foodstuff is forced. Upon extrusion, the resulting food product has a certain cross-sectional shape or configuration as determined by the passage(s) of the die. The product shape can be further defined by incorporating a cutoff machine into the process by which the extruded food product is automatically cut into discrete lengths to form the desired food product. Despite the widespread use of products embodied in the aforementioned patents, there exists a need in the art to provide an improved extrusion housing and die arrangement that can be used with existing or new dies, that is easier for the user to operate and clean and that is less expensive to manufacture than those disclosed in the prior art. The present invention is a significant improvement to systems and devices for producing extruded food products known in the art.

SUMMARY OF THE INVENTION

Accordingly, the present invention is directed to an apparatus for extruding foodstuffs is comprised of a one-piece housing having an inlet configured to be attached to a food processing machine, a distributor portion integrally formed with the inlet, the distributor portion having at least two side walls outwardly angled from the inlet, a die retaining portion configured for housing a die therein and integrally formed with the side walls, and an outlet through which an extruded food product can exit. A die defining at least one passage for forming a food product having a shape defined by the passage is inserted into the housing. A pair of removable retaining members extends through the housing and abuts against the die to retain the die within the housing. The pair of retaining members are each disposed on opposite sides of the housing and on opposite sides of the die.

In one embodiment, the housing is formed from a transparent plastic material to allow a user to view foodstuff flowing through the housing during an extrusion operation.

In another embodiment, at least two side walls of the distributor portion of the housing are angled at an acute angle relative to a longitudinal axis of the housing of between about 45 degrees and 15 degrees.

In another embodiment, the at least two side walls of the distributor portion of the housing are angled at an acute angle relative to a longitudinal axis of the housing of about 30.

In still another embodiment, the housing defines a window in a top wall thereof for user engagement of a top surface of the die in order to force the die toward the outlet of the housing when removing the die from the housing.

In yet another embodiment, a proximal end of the die abuts against an inside surface of the housing proximate a distal end of the distributor portion of the housing.

In another embodiment, the housing defines a transversely extending slot in a bottom side wall of the housing proximate a distal end of the die. The slot extends from proximate a left side wall of the housing to a right side wall of the housing.

In still another embodiment, a paper holder extends below the bottom side wall of the housing. The paper holder is configured to support a roll of paper and for guiding paper from the roller of paper through the slot.

In yet another embodiment, the pair of retaining pins each comprise a ring portion and a retaining portion. The retaining portion is integrally formed with the ring portion and extends through the housing.

In another embodiment, the housing defines an upper pair of apertures in the top side wall thereof and a lower pair of apertures in the bottom side wall thereof, the upper pair and lower pair of apertures are substantially vertically aligned and are each configured for receiving one of the pair of retaining members.

In still another embodiment, the pair of retaining members each define a proximal side that is substantially parallel to a longitudinal axis of the retaining member. The proximal side of each pair of retaining members abuts against the distal end of the die.

In yet another embodiment, the retaining portion of each of the pair of retaining members is tapered from proximate the ring portion to a distal end of the retaining member.

In still another embodiment, a plate is attached to the distal end of the housing for coupling a cutting device proximate the distal end of the housing.

In yet another embodiment, a ramp coupling member is coupled to the bottom side wall of the housing for coupling a ramp to the distal end of the housing.

The present invention also comprises a method of extruding a food product through an extruding apparatus. The method includes the steps of coupling an inlet of a one-piece housing to a food processing machine. The food processing machine is capable of forcing foodstuff into the inlet of the housing. The housing has a distributor portion integrally formed with the inlet and at least two side walls outwardly angled from the inlet. A die is selected that defines at least one passage longitudinally extending there through having a predetermined shape for forming a food product having a shape defined by the at least one passage.

The die is inserted into the die retaining portion of the housing through an outlet of the housing. The die retaining portion is integrally formed with the at least two side walls at distal ends thereof.

A pair of removable retaining members is inserted through the housing. The pair of removable retaining members abuts against the die to retain the die within the housing. The pair of retaining members are each disposed on opposite sides of the housing and on opposite sides of the die.

The food processing machine is employed to force foodstuff through the housing and the die to produce a food product having a cross-sectional shape defined by the at least one passage of the die.

The apparatus of the present invention is configured to be used with various dies, each having different passage configurations for forming food products of different extruded shapes and sizes. In order to change the die with a replacement die, the pair of retaining members are removed and the die is forced toward the distal end of the housing. The die is then removed from the housing. A new die is inserted into the housing and the pair of retaining members are reinserted through the housing to retain the new die within the housing.

In order to force the die from the housing, the user can engage a top surface of the die through a window in the housing to force the die toward the outlet of the housing.

When inserting the new die into the housing, the new die is inserted until a proximal end of the die abuts against an inside surface of the housing proximate a distal end of a distributor portion of the housing.

In order to provide a sheet of paper beneath the food product as it is being extruded, a roll of paper is coupled to the housing. The end of the roll of paper is fed through a transversely extending slot in a bottom side wall of the housing proximate a distal end of the die. The paper is then pulled through the outlet of the housing. As the food product exits the die, it will engage the paper and continue to pull the paper from the roll as the food product exits the housing. As such, the food product is backed by a sheet of paper for transferring the food product to packaging.

In one embodiment, a ramp is coupled to the distal end of the housing proximate the bottom side wall of the housing.

In another embodiment, a cutting device is coupled to the distal end of the housing proximate the top side wall of the housing.

BRIEF DESCRIPTION OF THE DRAWINGS

FIGS. 13 and 14 are perspective side views of retaining pins of the apparatus for extruding food products illustrated in FIG. 1.

FIG. 15 is a perspective side view of a paper holder of the apparatus for extruding food products illustrated in FIG. 1.

FIG. 16 is a perspective side view of a ramp holder of the apparatus for extruding food products illustrated in FIG. 1.

FIGS. 17A and 17B are distal and proximal perspective end views, respectively, of an equipment mounting plate of the apparatus for extruding food products illustrated in FIG. 1.

DETAILED DESCRIPTION OF THE ILLUSTRATED EMBODIMENTS

Those of ordinary skill in the art will realize that the following description of the present invention is illustrative only and not in any way limiting. Other embodiments of the invention will readily suggest themselves to such skilled persons, including without limitation combinations of features of the illustrated embodiments.

Figure 1:
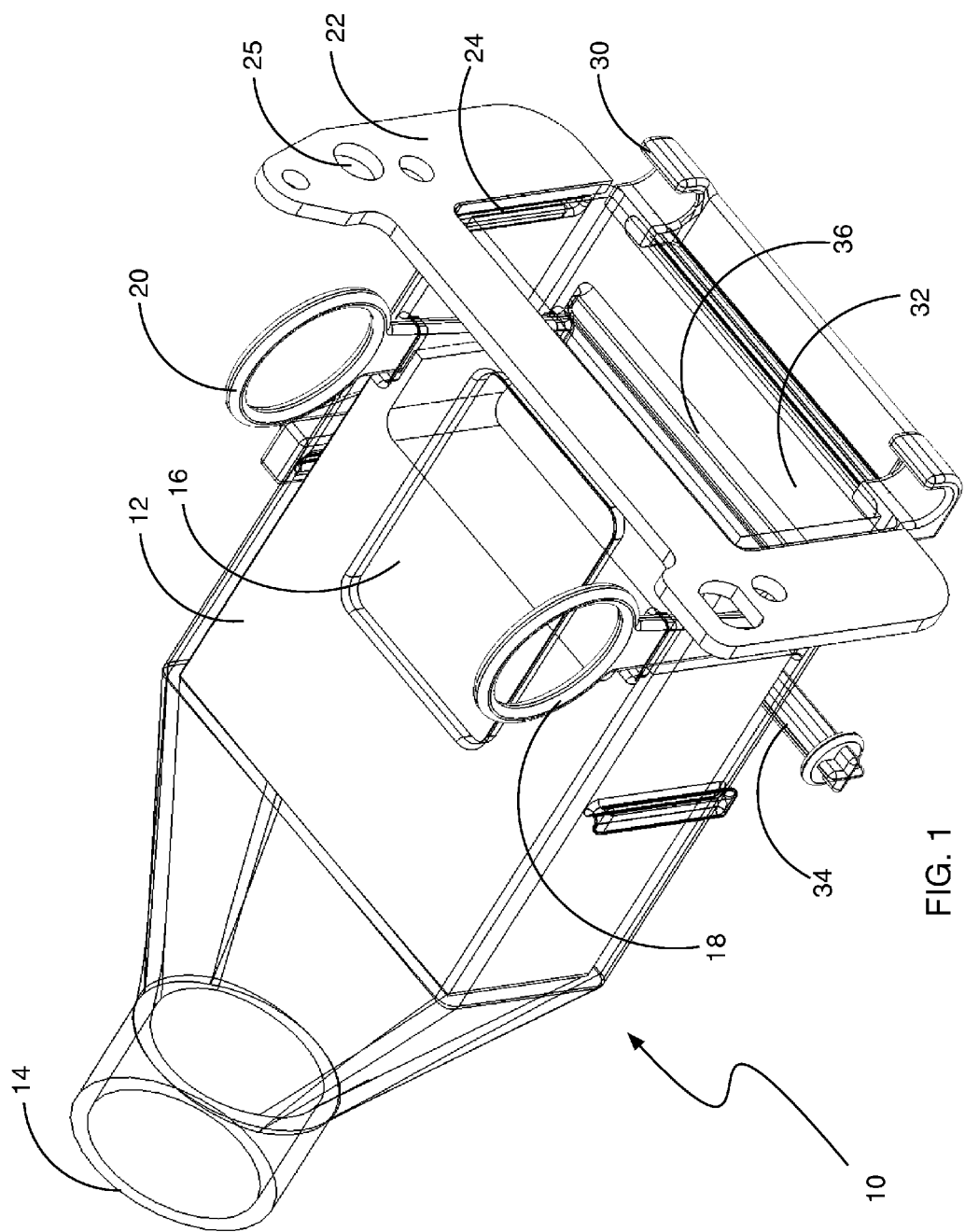
FIG. 1 is a perspective top view of an apparatus for extruding food products through a die in accordance with the principles of the present invention.

FIG. 1 illustrates an apparatus for extruding processed foodstuff, generally indicated at 10, and in particular for forming ground meat products into desired shapes by extrusion, in accordance with the principles of the present invention. The apparatus 10 is comprised of a housing 12 having a proximal end 14 configured for mounting to a foodstuff extrusion machine, such as a commercial meat grinder (not shown) or other similar machines known in the art. The housing 12 is comprised of a transparent plastic material such as polycarbonate or other transparent or semi-transparent materials known in the art. The transparency of the housing 12 allows a user to view the flow of foodstuff through the housing to ensure that the foodstuff is flowing properly through the housing 12 and, after use, that the housing has been properly cleaned by the removal of residual foodstuff after use of the housing. The housing 12 is constructed as a single, integral piece (i.e., one-piece construction) that can be formed by molding, machining or other methods of manufacturing known in the art. The one-piece construction of the housing 12 provides the user with a single part for assembly to the grinding machine and, as will be described in more detail, a simple and easy way for the extrusion dies used with the housing 12 to be removed and replace. Moreover, the one-piece construction of the housing 12 further provides less parts that must be cleaned between uses of the device The housing 12 is configured with a box-shaped body for receiving a forming block or die 16 through which the foodstuff is extruded to be formed into a shape determined by the die 16. The die 16 is held in place within the housing 12 with a pair of retaining pins and 20 that extend vertically through the housing 12. As will be described in more detail, the die 16 may include one or more passages through which foodstuff is extruded. The passages define a shape of the resulting extruded foodstuff. For example, a single rectangular passage in the die 16 could be used to form patties of ground meat or multiple cylindrical passages may be employed to form link sausages of ground meat.

An adapter or mounting plate 22 is attached to the outlet or distal end 24 of the housing 12. The mounting plate is provided with a plurality of holes, such as hole 26 for mounting a cutting device known in the art, such as a guillotine-type cutting device that can cut the foodstuff being extruded through the die 16 into predetermined lengths.

A tray attachment member 30 is coupled to the bottom side 32 of the distal end 24 of the housing 12. The tray attachment member 30 is configured for receiving one end of a support tray or ramp upon which the extruded foodstuff can rest as it is being extruded.

Secured to the housing 12 and extending below the housing is a paper roll holder 34 for supporting a paper roll that is fed through the slot 36 in the bottom side 32 of the housing 12 and out through the distal end of the housing 12. The paper (not shown) is provided to allow the foodstuff to be extruded in ribbon form out of the housing 12 for packaging where the paper is packaged along with the foodstuff.

Figure 2:
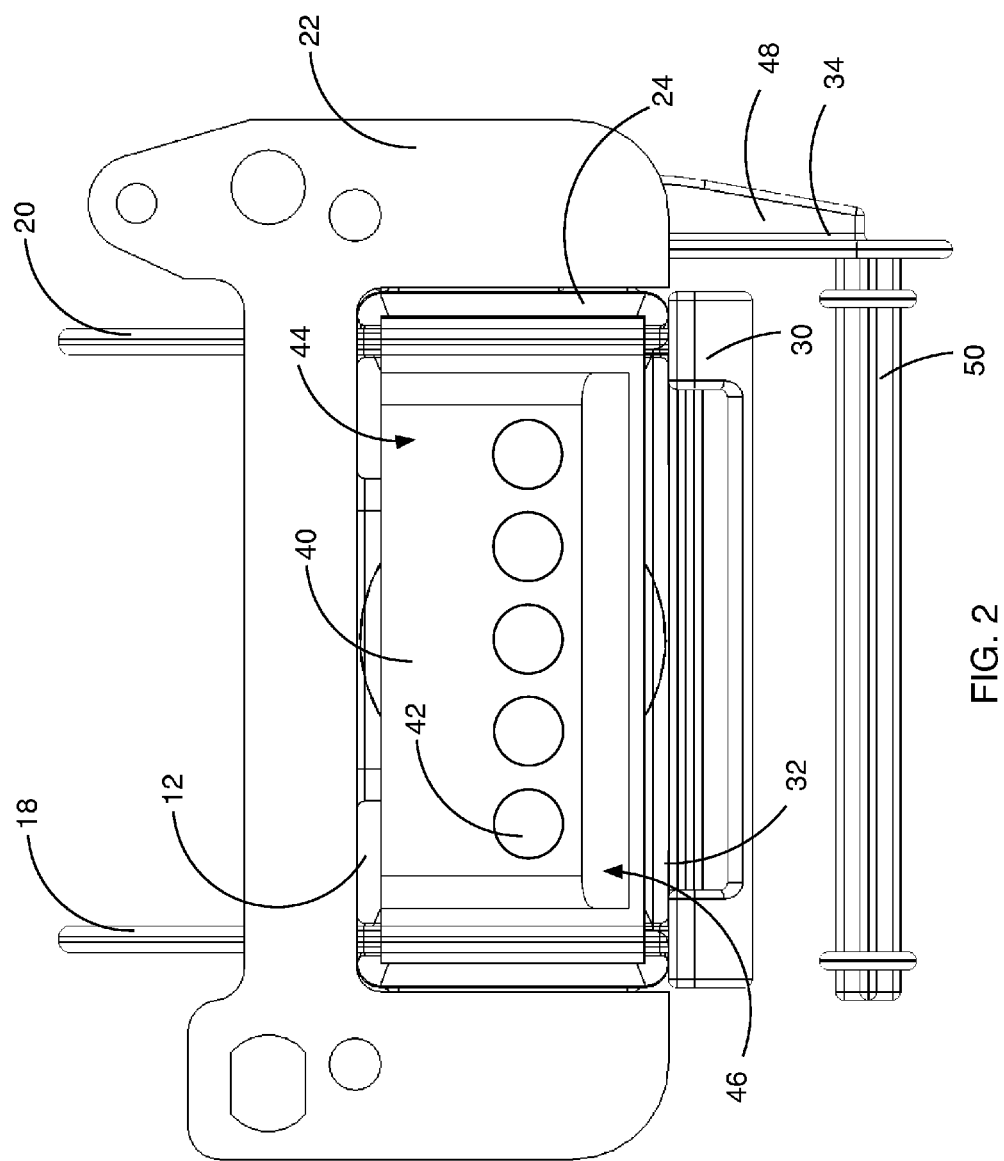
FIG. 2 is a distal end view of the apparatus for extruding food products shown in FIG. 1 with a die for forming link sausages according to the principles of the present invention.

As shown in FIG. 2, a die 40 having a plurality of passages, such as passage 42, is positioned within the housing. The passages 42 extend the longitudinal length of the die and are generally cylindrical in shape. As will be described in more detail, various other dies may be used that have one or more passages of a different shape in order to form the food product into a desired extruded shape. The die 40 is retained within the housing 12 by retaining pins 18 and 20. The plate 22 defines an opening 44 that is approximately the size and shape of the opening 46 at the distal end 24 of the housing. The tray holder 30 depends from the bottom side 32 of the housing 12 and is thus positioned below the opening 46. The paper holder 34 is an L-shaped structure that is coupled by a first portion 48 to the side of the housing 12 with a second portion 50 extending beneath the bottom side 32 laterally across the housing 12. The second portion 50 is spaced below the bottom side 32 of the housing 12 so as to allow a roll of paper (not shown) to be positioned on the second portion 50 and to be freely rotatable relative thereto. The second portion 50 is cantilevered relative to the first portion 48 and substantially extends the width of the bottom side 32.

Figure 3:
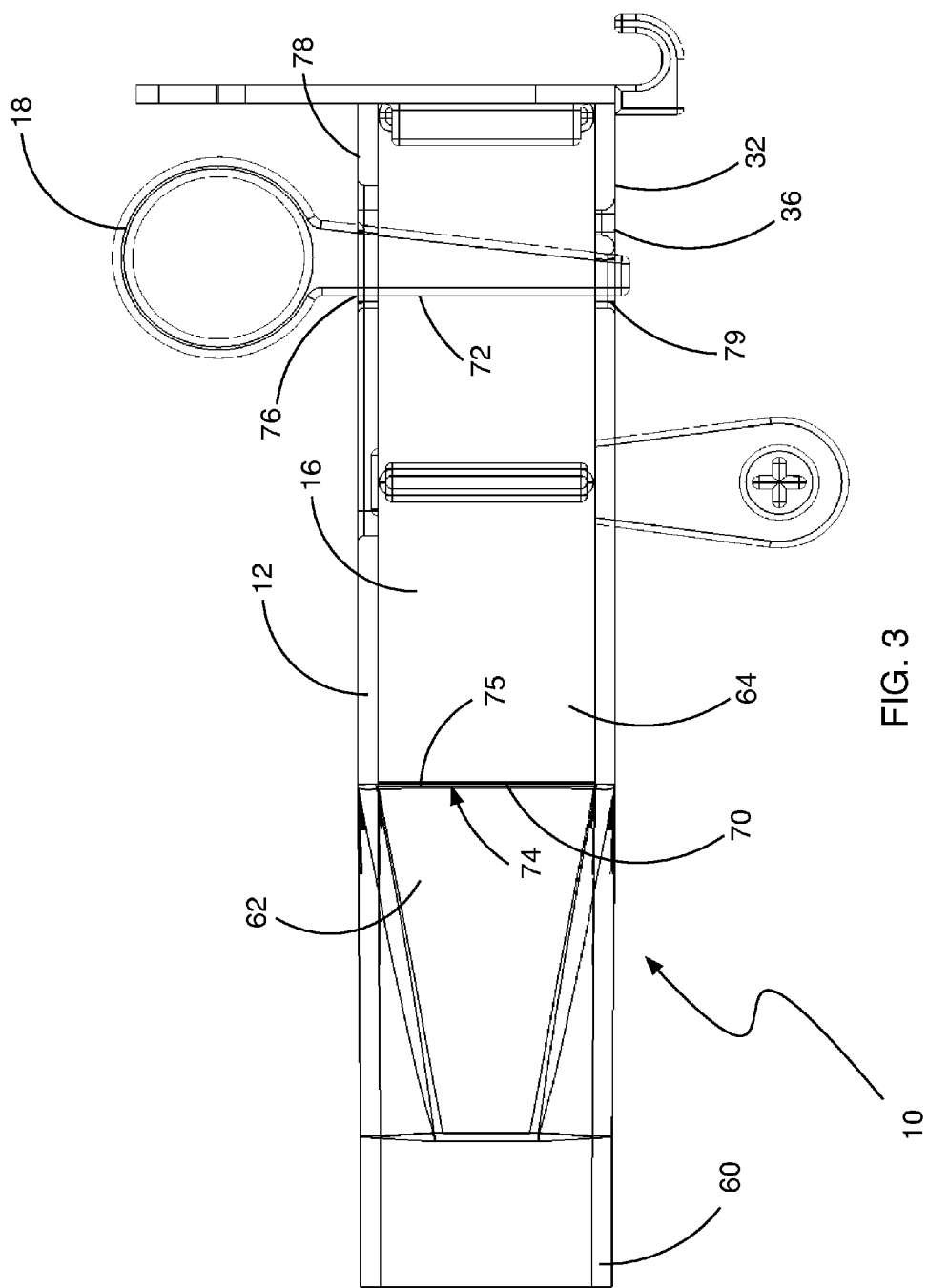
FIG. 3 is a right side view of the apparatus for extruding food products shown in FIG. 1.
Figure 4:
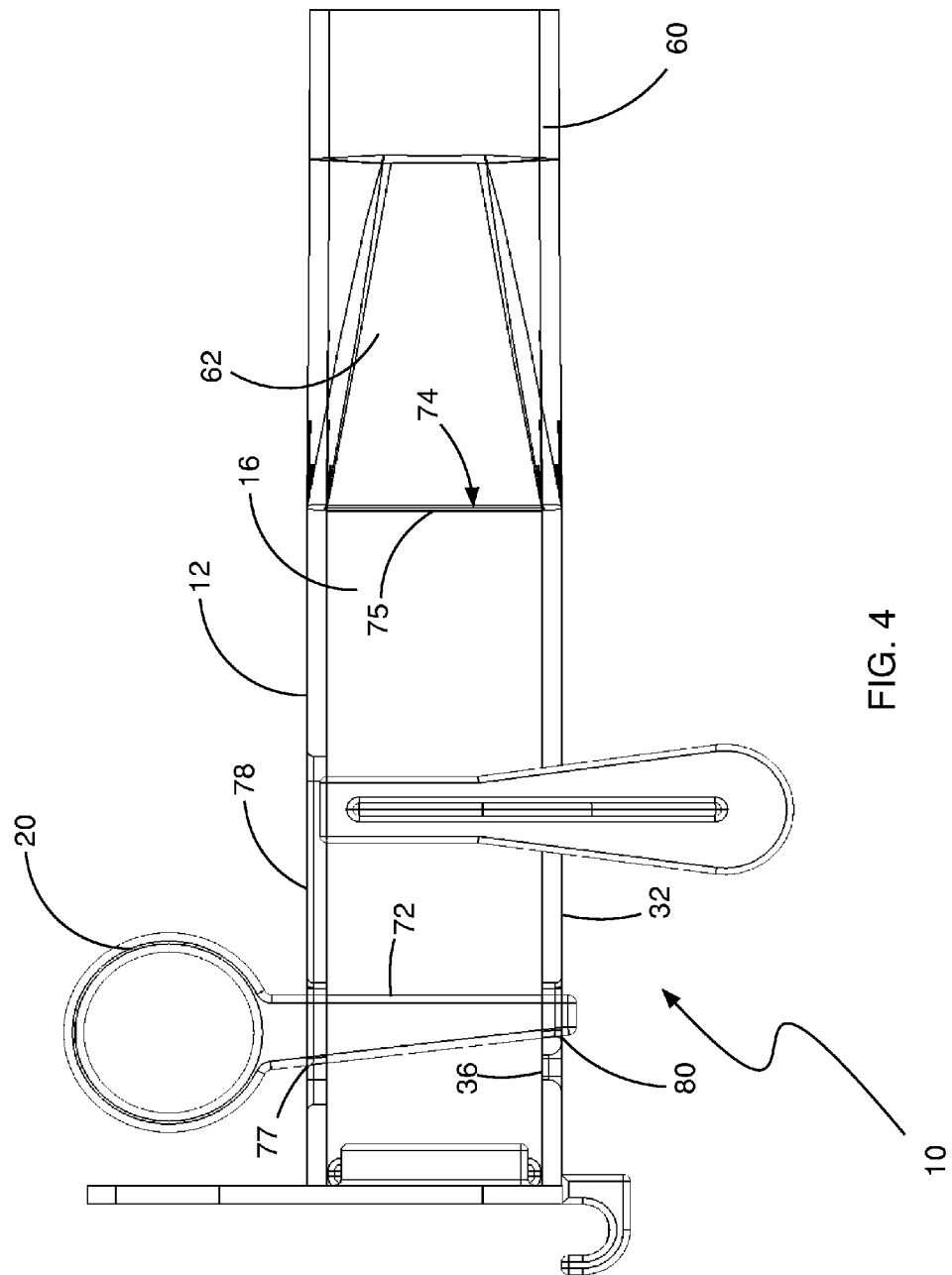
FIG. 4 is a left side view of the apparatus for extruding food products shown in FIG. 1.
Figure 5:
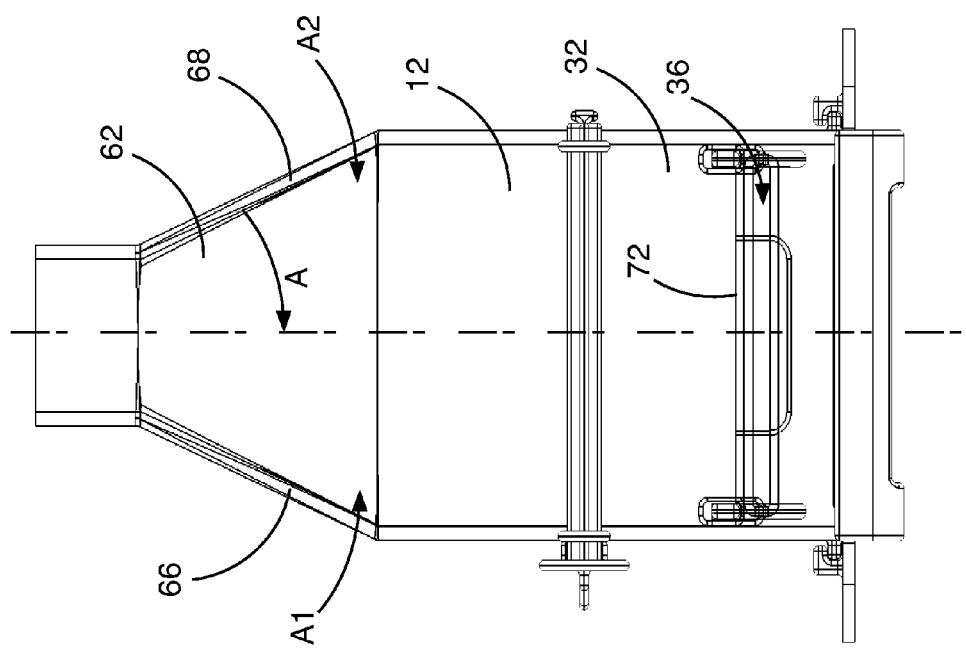
FIG. 5 is a bottom side view of the apparatus for extruding food products shown in FIG. 1.

Referring now to FIGS. 3 and 4, a right side view and a left side view of the press 10 are illustrated, respectively. The housing 12 includes an inlet 60 in the form of a cylindrical end portion adapted to be connected to an extruding machine, such as a commercial grinder. The inlet 60 may include external threads for engaging with an internally threaded collar of the extruding machine as is known in the art. Contiguous with the distal end of the inlet 60 is a distributor portion 62. The distributor portion is flared to form a transition from the inlet 60 to the body or die retaining portion 64 of the housing. As shown in FIG. 5, the distributor portion 62 is comprised of a pair of opposite side walls 66 and 68 that are angled relative to a longitudinal axis of the housing 12 at an acute angle A of between about 45 degrees and about 15 degrees. As illustrated, the side walls 66 and 68 are angled at angle A relative to the longitudinal axis of the housing 12 at about 30 degrees. The angle A of the side walls 66 and 68, by being at an acute angle relative to the longitudinal axis of the housing 12 of about 45 degrees or less allows the foodstuff being forced through the end portion 60 to flow through the tapered portion 62 and through the die 16. Angles of greater than about 45 degrees cause the foodstuff to become pooled in areas A1 and A2 of the distributor portion 62 adjacent the side walls 66 and 68 such that the force of the foodstuff entering the distributor portion 62 causes greater force in a lateral direction than a longitudinal direction at the sidewalls 66 and 68 so that only a central portion of the foodstuff passing through the tapered portion is actually forced through the passages of the die 16. In such a situation, the foodstuff may only exit a few of the passages at the center of the die when a multi-passage die is used, such as the die 40 illustrated in FIG. 2 is used. The result will be in most situations an unsatisfactory food product configuration exiting the die 16.

As further illustrated in FIGS. 3 and 4, the die 16 is sized and shaped to fit relatively tightly within the housing 12 so as to be easily insertable and removable from the housing 12 as desired, but that will prevent any significant amount of foodstuff from passing between die 16 and the housing 12. The die 16 is comprised of a generally rectangular shaped block having a proximal end 70 and a distal end 72 with one or more passages extending between the proximal and distal ends 70 and 72, respectively. The die 16 defines a front face 74 that is sized and shaped to abut against the distal end 75 of the tapered portion 62 so that when forced against the distal end of the tapered portion 62, foodstuff being forced through the tapered portion 62 will not flow around the die 16. The die 16 is held against the distal end 76 of the tapered portion 62 by the retaining pins 18 and 20. The retaining pins extend through apertures 76 and 77 in the top side 78 and corresponding apertures 79 and 80 in the bottom side 32 of the housing 12. The retaining pins 18 and 20 abut against the distal end 72 of the die 16 to essentially wedge the die 16 in place so as to prevent any substantial movement of the die 16 relative to the housing 12 as foodstuff is forced through the die 16. The tapering of the pins allows the pins to function as wedges between the housing 12 and the die 16 in order to force the die toward the proximal end of the housing 12. When properly seated, the pins 18 and 20 will abut against the die 16 on one side thereof and against the distal ends of the housing apertures through which the pins 18 and 20 are inserted. As such, the distance between the distal ends of the apertures 76 and 77 and 79 and 80 are approximately equal to the longitudinal length of the die plus the width of the retaining pin at the location of the respective aperture when properly inserted. This ensures that the pins will tightly wedge the die 16 within the housing 12. Also, since the front sides of the pins 18 and 20 are substantially parallel to the longitudinal axis of the pins 18 and 20 as illustrated, the force of the die 16 against the pins 18 and 20 during a food extrusion process will not cause the pins 18 and 20 to work loose relative to the housing (i.e., by moving upwardly relative to the housing 12).

As further illustrated in FIG. 5, the bottom surface 32 of the housing 12 defines laterally extending slot 36 that extends substantially the width of the bottom surface 32. The slot 36 is positioned proximate the distal end 72 of the die 16 so that as food product is extruded from the die 16 it is nearly simultaneously received by paper exiting the slot 36. The paper is pulled from a roll of paper disposed on the paper holder 34 that is fed through the slot 36. Referring again to FIGS. 3 and 4, because the slot 36 is supposed to be as close as possible to the slot and the retaining pins 18 and 20 are positioned between the distal end of the block 16 and the slot 36, the pins 18 and 20 are tapered from a top end to a bottom end so as to provide sufficient lateral strength to maintain the position of the die 16 during use but that allows the slot 36 to be positioned sufficient close to the distal end of the die so that the food product exiting the die 16 will not be in any significant contact with the housing 12 between the distal end of the die 16 and the slot 36 so that the food product is almost immediately supported by the paper as the food product exits the housing 12.

Figure 6:
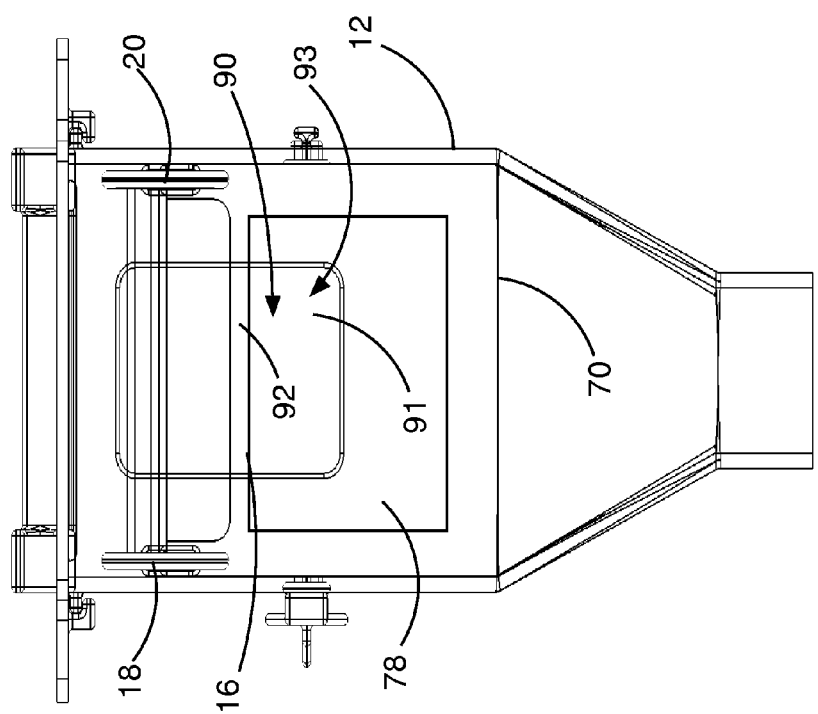
FIG. 6 is a top side view of the apparatus for extruding food products shown in FIG. 1.

As illustrated in FIG. 6, the top side wall 78 of the housing 12 defines a window or opening 90 that is in communication with the interior of the housing 12. When a user desires to clean the housing 12 and die 16 or needs to change the die 16 with a die having a different passage configuration, the user removes the pins 18 and 20 by grasping the ring portion of each pin and pulling the pins from the housing 12. The window 90 allows a user to then grasp a top surface 91 of the die 16 for removal of the die 16 from the housing 12. In particular, the die 16, as will be described in more detail, is provided with an upwardly extending wall 92 on a top side thereof that defines a top recess 93 in the die 16. Reaching through the window 90, the user can engage the wall 92 on top surface 91 of the die 16 and push the proximal side of the wall toward the distal end of the housing 12 until the proximal end of the die 16 is exposed through the window 90 at which point the user can grasp the proximal end 70 of the die 16 and completely force the die 16 from the housing 12. Thus, the window 90 is longitudinally long enough to allow the user to grasp the proximal end of the die 16 as it is being removed from the housing 12 when the wall 92 reaches the distal end of the window 90. Once removed from the housing, the die 16 can be cleaned and/or replaced with a die having a different configuration for producing food product of having the configuration of the die.

Figure 7:
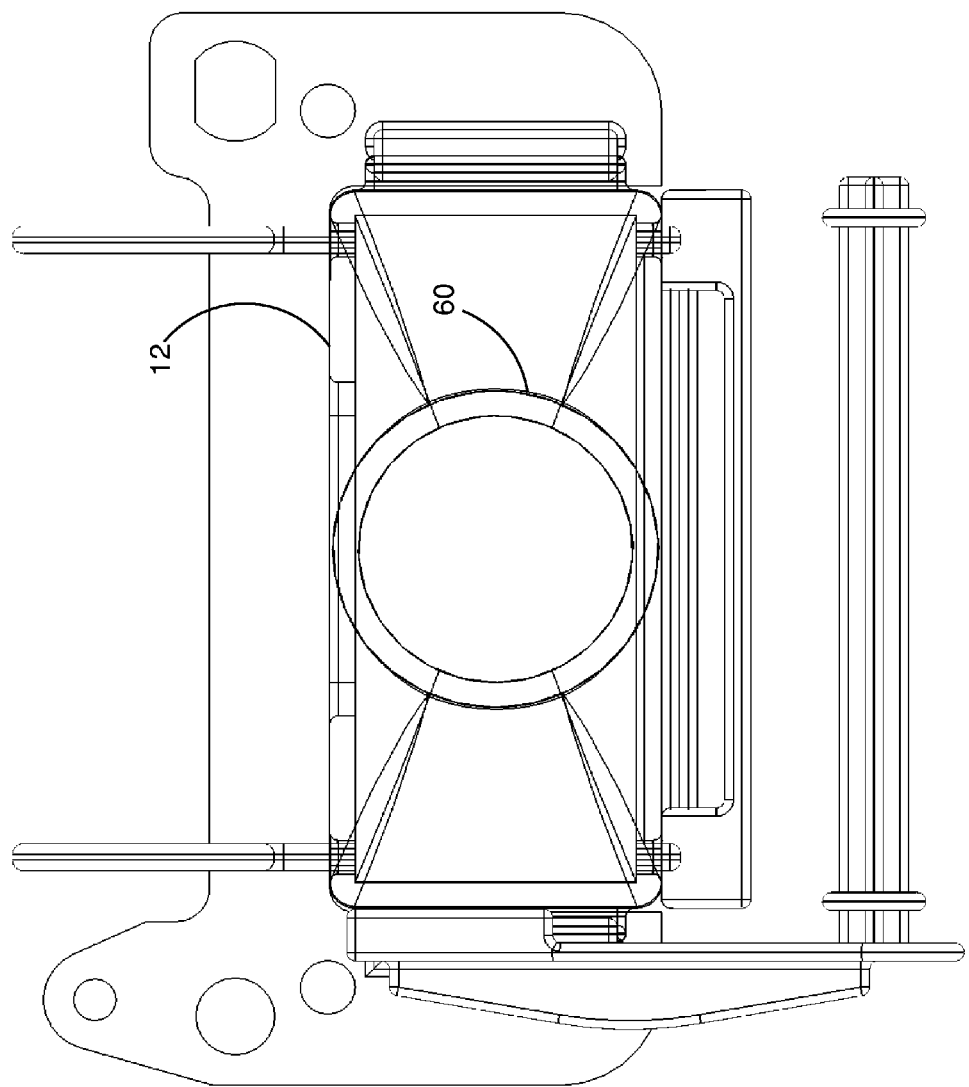
FIG. 7 is a proximal end view of the apparatus for extruding food products shown in FIG. 1.

As shown in FIG. 7, the diameter of the proximal cylindrical end of the housing is approximately equal to a height of the body of the housing 12. This, along with the angle of the taper of the sides of the tapered portion previously discussed, helps to ensure that the foodstuff being forced through the cylindrical end portion of the housing 12 is properly and substantially evenly and simultaneously forced through all passages of the die 16. This is important to ensure that the resulting food product has a uniform configuration as it exits the die 16. For example, when making link-type sausages by using, for example, the die 40 shown in FIG. 2, the link-type sausages will be transferred from the die to the paper as the food product is extruded. If the links were extruded from the passages at different pressures, the resulting links would necessarily be of different lengths and not in the form of an acceptable food product for retail sale. In other words, to be acceptable, the links in a package should all be approximately the same length and of substantially the same diameter for consistency and uniformity of product.

Figure 8:
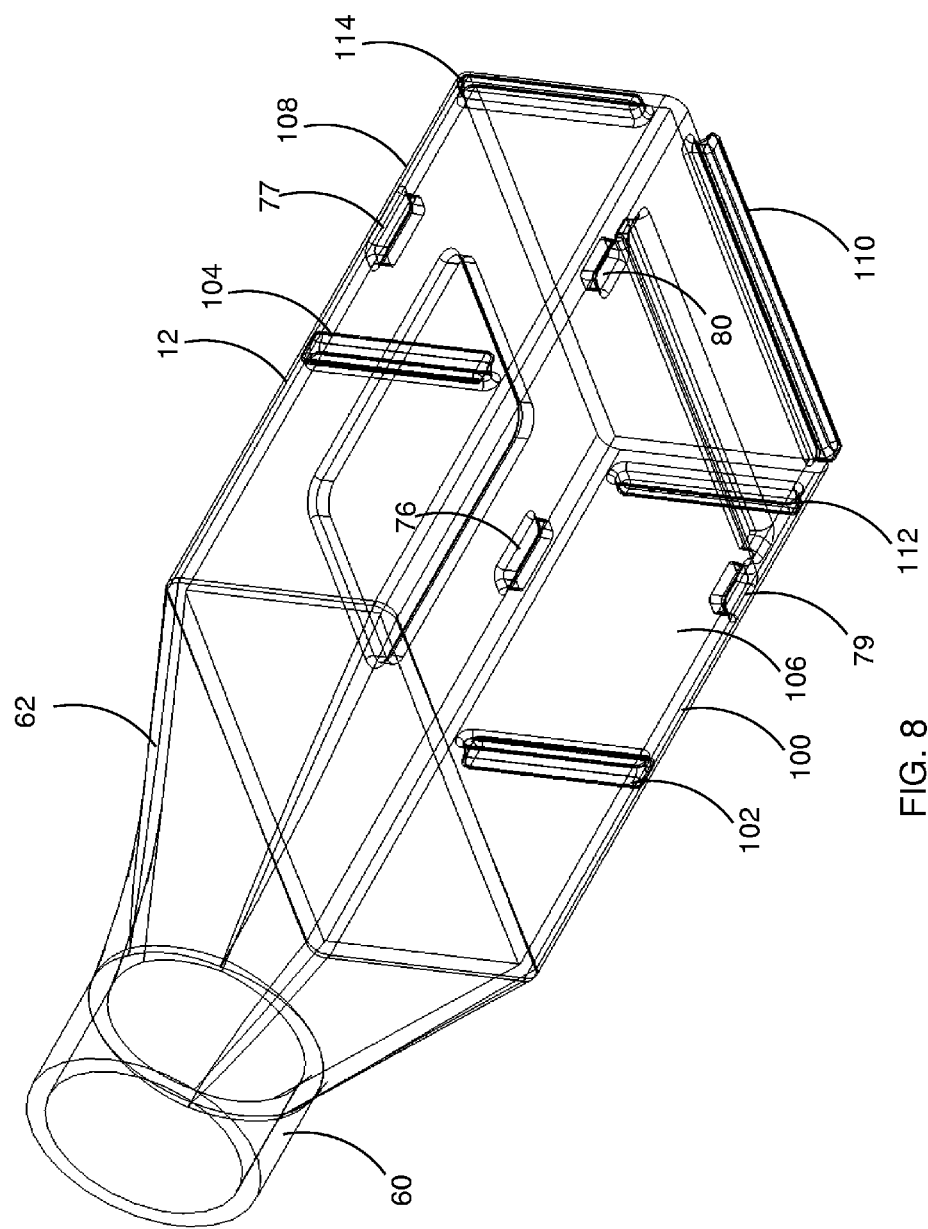
FIG. 8 is a perspective side view of a housing of the apparatus for extruding food products illustrated in FIG. 1.
Figure 9:
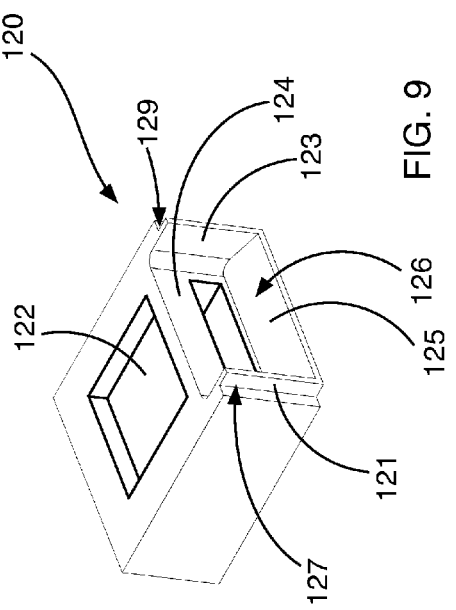
FIGS. 9-12 are perspective side views of various embodiments of dies for use in the apparatus for extruding food products illustrated in FIG. 1 according to the principles of the present invention.
Figure 10:
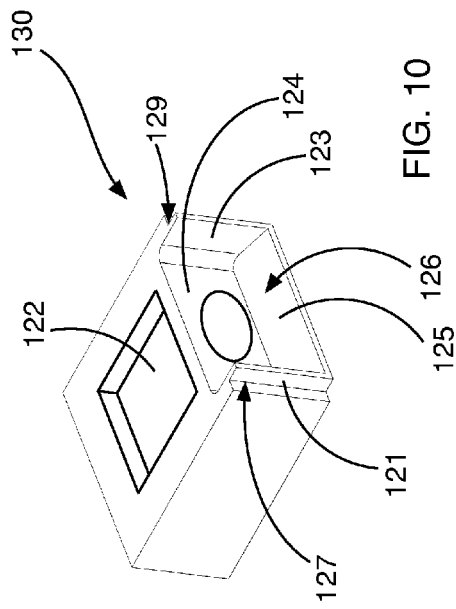
Figure 11:
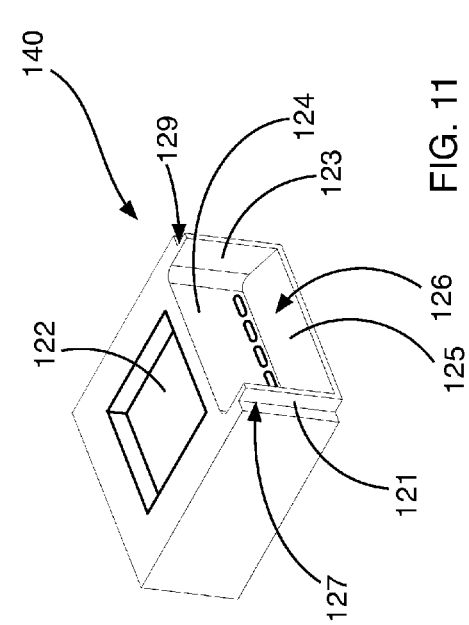
Figure 12:
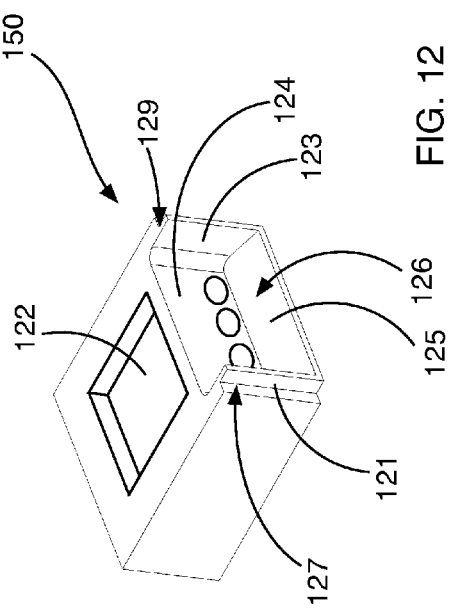

Referring now to FIG. 8, a perspective view of the one-piece press housing 12 according to the present invention is illustrated. The housing 12 is comprised of three integrated portions including the attachment portion 60, the tapered transition portion 62 and a box-shaped body portion 100 for housing a die as previously described. The body portion 100 is primarily utilized to secure a die to a output of a foodstuff extruding machine known in the art, but also, as previously described, to support the paper holder and to guide the paper relative to the food product being produced as well as to mount a ramp and/or packaging equipment to the distal end of the housing 12, such as a guillotine-style cutting device for creating predetermined lengths of food product as they are being extruded. In order to support the paper holder previously described, the housing includes T-shaped protrusions 102 and 104 that vertically extend along the sides 106 and 108, respectively, of the housing 12. As will be further described, the paper holder is configured with a channel to receive one of the protrusions 102 and 104 so as to allow the paper holder to be suspended from the housing 12. A similarly shaped elongate protrusion 110 is provided along the bottom surface of the housing 12 so as to receive a ramp support member, to be further described. The side walls 106 and 108 are further provided with vertically oriented, elongate protrusions 112 and 114 for securing the plate member to which other processing equipment can be attached, such as a guillotine-style cutting device known in the art. To accommodate the pins 18 and 20 previously described apertures 76, 77, 79 and 80 are provided. Because the pins 18 and 20 are tapered from their upper ends to their distal ends, the upper apertures 76 and 77 are larger than the lower apertures 79 and 80 so as to accommodate the size of the pins 18 and 20 and allow the pins to extend completely through the housing 12 from the top surface through the bottom surface thereof in order to allow the pins 18 and 20 to fully engage the die and to be adequately supported relative to the housing 12.

FIGS. 9-12 illustrate various dies 120, 130, 140 and 150 that can be used with the housing 12 of the present invention. Each die 120, 130, 140 and 150 is a generally block-type structure having a rectangular recess 122 in the top surface thereof for grasping the die through the window of the housing as previously described. The back side of the die 120 defines a generally planar interface for abutting against the distal end of the tapered portion of the housing 12 as previously described. The exposed face 124 of each die, through which the extruded food product bearing a shape determined by the particular die 120, 130, 140 or 150, defines a recess 126 that is defined by side wall portions 121 and 123 and bottom ramp portion 125. The ramp portion 125 extends from proximately a lower end of the passage(s) of the die and downwardly extends so that as the food product is extruded from the passage(s) the food product is smoothly transferred from the die 120, 130, 140 or 150 to the paper previously discussed. The side wall portions 121 and 123 are further defined by retaining pin recesses 127 and 129 that extend the vertical length of the die and essentially form a notch in the exposed face 124 for abutting against the pins 18 and 20 as previously described. With each die providing a different extrusion shape, the dies can be interchanged during operation in order to produce various food products without having to remove the housing 12 from the extruding machine. That is the die 120 illustrated in FIG. 9 could be used to make a patty, while the die 130 illustrated in FIG. 10 could be used to form a large tubular member that can be subsequently cut into larger ball shapes, as for meatballs. Similarly, the die 140 illustrated in FIG. 11 could be used to form thin strips of food product, as form making jerky strips. Finally, die 150 illustrated in FIG. 12 could be used to form larger tubes of food product three at a time, as for forming standard sized sausages. Of course, those of skill in the art will appreciate that other die configurations could be used in accordance with the principles of the present invention in order to provide food products of various sizes and shapes as desired by a user.

Advantageously, during an extruding operation, the user can easily change from die to die as desired in a simple and relatively quick manner. Once the extrusion machine is stopped, the user removes any paper from the slot 36 of the housing 12. The user then removes the retaining pins 18 and 20 and removes the die that is currently being held within the housing by the pins 18 and 20 by sliding the die toward and out of the distal end of the housing 12. A new die can then be inserted into the housing until the die abuts against the distal end of the housing 12. Once fully inserted, the retaining pins 18 and 20 can then be reinserted through the housing 12 to hold the new die in place. The paper can then be rethreaded through the slot 36 an out of the distal end of the housing 12. The extrusion machine is then started to begin the extrusion process and a food product having a new shape determined by the new die can be produced. Thus, compared to the prior art devices, the housing/die arrangement of the present invention allows for quick and easy interchanging of dies without any significant time in production for the user. Such time savings over longer periods of time can result in significant production increases and lower overall production costs for the user.

FIGS. 13 and 14 illustrate the retaining pins 18 and 20. Each pin 18 and 20 is provided with an upper ring portion 160 and 161, respectively, and a tapered die retaining portion 162 and 163, respectively. The ring portion is sized to allow a user to grasp the ring 160 or 161 with a finger to pull the pin 18 or 20 from the housing in order to remove the die. The retaining portions 162 and 163 are tapered, being wider adjacent the ring portions 160 and 161 and narrower toward the distal end of the ring. The sides 164 and 165 of the rings that abut against the die to hold it in place within the housing is substantially parallel to the longitudinal axis of the retaining pins 18 and 20 (this is shown more clearly in FIGS. 3 and 4). The opposite sides 166 and 168 are angled at an acute angle of between about 5 to 15 degrees relative to the longitudinal axis of the pin in order to form the tapered retaining portions 162 and 163. As illustrated in FIGS. 3 and 4, this tapering allows the distal ends of the pins to be seated within the apertures formed in the bottom side wall of the housing that are positioned between the distal end of the die and the proximal side of the paper slot in order to have the paper slot as near as possible to the distal end of the die while maintaining sufficient structural strength of the pins 18 and 20 and maintaining abutting contact between the sides 164 an 165 of the pins 18 and 19 and the die.

FIGS. 15 and 16 illustrate various attachments that can be coupled to the housing. FIG. 15 illustrates the L-shaped paper holder 34. As previously described, the paper holder 34 is an L-shaped structure that is coupled by a first portion 48 to the side of the housing 12 with a second portion 50 that horizontally extends for being positioned beneath the bottom side wall 32 of the housing 12. The second portion 50 is configured with an X-shaped cross-section sot as to provide structural strength to its cantilevered construction. Retaining discs 190 and 191 are provided to abut against the sides of the paper roll in order to retain the relative position of the paper roll relative to the paper support portion as the paper rotates.

FIG. 15 illustrates a tray or ramp attachment member 30 to which lugs of a tray or ramp can be coupled. The attachment member 30 is configured with a pair of oppositely disposed U-shaped portions 194 and 195 upon which lugs of a tray or ramp can rest. The support member 30 also includes a longitudinally extending recess for being coupled to the elongate projection 110 (shown in FIG. 8) on the distal end of the housing 12. While the attachment member 30 is configured for attaching to a particularly configured ramp or tray, other attachment members could be configured for attaching to various other process equipment known in the art.

FIGS. 17A and 17B illustrate the mounting 22 is illustrated. The mounting plate 22 is a generally C-shaped structure defining an opening 180 sized for mounting over and around the distal end 24 of the housing 12 shown in FIG. 1 and as previously described. The top 181 of the opening 180 is configured to abut against the top surface of the housing so as to position the plate 22 relative to the housing 12. L-shaped retaining members 184 and 185 are oppositely oriented on the side portions 186 and 187, respectively, of the plate 22 that are positioned to slide onto the elongate protrusions 112 and 114 on the housing (see FIG. 8). When slid onto the housing 12, the L-shaped retaining members 184 and 185 hold the plate 22 to the distal end 24 of the housing 12. The plate 22 is provided with various holes, such as hole 26 configured for mounting other processing equipment to the distal end of the housing.

It is further contemplated that the present invention sets forth a unique method of extruding a food product through an extruding apparatus. The method includes the steps of coupling an inlet of a one-piece housing to a food processing machine, such as an existing food grinder configured, for example, for grinding meat products. The food processing machine is capable of forcing foodstuff into the inlet of the housing and through the die in order to produce an extruded form of the food product in the shape of the passages provided in the particular die. The housing has a distributor portion integrally formed with the inlet. The distributor portion has at least two side walls outwardly angled from the inlet.

A die is selected that defines at least one passage longitudinally extending through the die having a predetermined shape for forming a food product having a shape defined by the at least one passage.

The die is inserted into the die retaining portion of the housing through an outlet of the housing. The die retaining portion is integrally formed with the at least two side walls at distal ends thereof.

A pair of removable retaining members is inserted through the housing. The pair of removable retaining members abuts against the die to retain the die within the housing. The pair of retaining members are each disposed on opposite sides of the housing and on opposite sides of the die.

As previously mentioned, the food processing machine is employed to force foodstuff through the housing and the die to produce a food product having a cross-sectional shape defined by the at least one passage of the die.

It should be noted that the method and apparatus of the present invention is configured to be used with various dies, each having different passage configurations for forming food products of different extruded shapes and sizes. In order to change the die with a replacement die, the pair of retaining members are removed and the die is forced toward the distal end of the housing. The die is then removed from the housing. A new die is inserted into the housing and the pair of retaining members are reinserted through the housing to retain the new die within the housing.

In order to force the die from the housing, the user can engage a top surface of the die through a window in the housing to force the die toward the outlet of the housing.

When inserting the new die into the housing, the new die is inserted until a proximal end of the die abuts against an inside surface of the housing proximate a distal end of a distributor portion of the housing.

In order to provide a sheet of paper beneath the food product as it is being extruded, a roll of paper is coupled to the housing. The end of the roll of paper is fed through a transversely extending slot in a bottom side wall of the housing proximate a distal end of the die. The paper is then pulled through the outlet of the housing. As the food product exits the die, it will engage the paper and continue to pull the paper from the roll as the food product exits the housing. As such, the food product is backed by a sheet of paper for transferring the food product to packaging.

A ramp may be coupled to the distal end of the housing proximate the bottom side wall of the housing. Likewise, a cutting device may be coupled to the distal end of the housing proximate the top side wall of the housing.

It should be noted that the particular housing/die/pin arrangement illustrated and described herein is provided so that preexisting dies, such as those disclosed in U.S. Pat. No. 5,198,237, incorporated herein by reference, can be utilized with the housing and pin arrangement of the present invention. It is further contemplated, however, that dies having different configurations could be used so that the pins would not necessarily need to reside between the distal end of the die and the paper slot so that the paper slot could be moved even closer to the distal end of the die. Thus, it is contemplated that various housing/die/pin arrangements could be adapted in accordance with the principles of the present invention to provide a similarly configured and working apparatus to that which has been specifically illustrated and described herein.

Accordingly, the illustrated embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. Those skilled in the art who have the benefit of this invention, its teachings, and suggestions will appreciate that the conceptions of this disclosure may be used as a creative basis for designing other structures, methods and systems for carrying out and practicing the present invention.

While there have been described various embodiments of the present invention, those skilled in the art will recognize that other and further changes and modifications may be made thereto without department from the spirit of the invention, and it is intended to claim all such changes and modifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or structures similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the configuration, design and construction of the invention to achieve those advantages including combinations of components of the various embodiments. Hence, reference herein to specific details of the structure and function of the present invention is by way of example only and not by way of limitation.

What is claimed is:

1. An apparatus for extruding foodstuffs, comprising:
    a one-piece housing comprising:
        an inlet configured to be attached to a food processing machine;
        a distributor portion integrally formed with the inlet, the distributor portion having at least two side walls outwardly angled from the inlet;
        a die retaining portion configured for housing a die therein and integrally formed with the distributor portion; and
        an outlet through which an extruded food product can exit;
    a die defining at least one passage longitudinally extending there through having a predetermined shape for forming a food product having a shape defined by the at least one passage;
    a pair of removable retaining members extending through the housing and abutting against the die retaining the die within the housing, the pair of retaining members each disposed on opposite sides of the housing and on opposite sides of the die, and each comprising a ring portion and a retaining portion, the retaining portion integrally formed with the ring portion and extending through the housing, the housing defining an upper pair of apertures in a top side wall thereof and a lower pair of apertures in a bottom side wall thereof, the upper pair and lower pair of apertures being substantially vertically aligned with each of the vertically aligned upper and lower apertures configured for receiving one of the pair of retaining members.

2. The apparatus of claim 1, wherein the housing is formed from a transparent plastic material to allow a user to view foodstuff flowing through the housing during an extrusion operation.

3. The apparatus of claim 1, wherein the at least two side walls of the distributor portion of the housing are angled at an acute angle relative to a longitudinal axis of the housing of between about 45 degrees and 15 degrees.

4. The apparatus of claim 1, wherein the at least two side walls of the distributor portion of the housing are angled at an acute angle relative to a longitudinal axis of the housing of about 30 degrees.

5. The apparatus of claim 1, wherein the housing defines a window in a top wall thereof for user engagement of a top surface of the die in order to force the die toward the outlet of the housing when removing the die from the housing.

6. The apparatus of claim 1, wherein a proximal end of the die abuts against an inside surface of the housing proximate a distal end of the distributor portion of the housing.

7. The apparatus of claim 1, wherein the housing defines a transversely extending slot in a bottom side wall of the housing proximate a distal end of the die, the slot extending from proximate a left side wall of the housing to a right side wall of the housing.

8. The apparatus of claim 7, further comprising a paper holder extending below the bottom side wall of the housing, the paper holder configured to support a roll of paper and for guiding paper from the roller of paper through the slot.

9. The apparatus of claim 1, wherein the pair of retaining members each define a proximal side that is substantially parallel to a longitudinal axis of the retaining member, the proximal side of each pair of retaining members abutting against the distal end of the die.

10. The apparatus of claim 9, wherein the retaining portion of each of the pair of retaining members is tapered from proximate the ring portion to a distal end of the retaining member.

11. The apparatus of claim 1, further comprising a plate configured to be attached to the distal end of the housing for coupling a cutting device proximate the distal end of the housing.

12. The apparatus of claim 1, further comprising a ramp coupling member coupled to the bottom side wall of the housing for coupling a ramp to the distal end of the housing.

* * * * *